(12) United States Patent
Komiya

(10) Patent No.: US 8,919,093 B2
(45) Date of Patent: Dec. 30, 2014

(54) CABLE PROTECTION AND GUIDE DEVICE

(71) Applicant: Tsubakimoto Chain Co., Osaka (JP)

(72) Inventor: Shoichiro Komiya, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 54 days.

(21) Appl. No.: 13/763,702

(22) Filed: Feb. 10, 2013

(65) Prior Publication Data

US 2013/0212997 A1 Aug. 22, 2013

(30) Foreign Application Priority Data

Feb. 17, 2012 (JP) ................................ 2012-033058

(51) Int. Cl.
*F16G 13/00* (2006.01)
*H02G 11/00* (2006.01)
*H02G 3/04* (2006.01)

(52) U.S. Cl.
CPC .......... *H02G 11/006* (2013.01); *H02G 3/0475* (2013.01); *Y10S 59/90* (2013.01)
USPC ................... 59/78.1; 59/900; 248/49; 248/51

(58) Field of Classification Search
CPC ..................................................... F16G 13/16
USPC ............................... 59/78.1, 900; 248/49, 51
See application file for complete search history.

(56) References Cited

U.S. PATENT DOCUMENTS

| 7,392,650 | B2 * | 7/2008 | Utaki et al. | 59/78.1 |
| 7,513,096 | B2 * | 4/2009 | Utaki et al. | 59/78.1 |
| 7,893,353 | B2 * | 2/2011 | Utaki | 59/78.1 |
| 8,505,272 | B1 * | 8/2013 | Komiya | 59/78.1 |
| 8,707,670 | B2 * | 4/2014 | Komiya | 59/78.1 |

FOREIGN PATENT DOCUMENTS

| JP | 2004527706 A | 9/2004 |
| JP | 2007092939 A | 4/2007 |
| JP | 2007247716 A | 9/2007 |
| WO | 02086349 A1 | 10/2002 |

* cited by examiner

*Primary Examiner* — David B Jones
(74) *Attorney, Agent, or Firm* — Woodling, Krost and Rust

(57) ABSTRACT

A cable protection and guide device capable of preventing abrasion powder that is otherwise generated when a link side plate slides on a support surface while switching between a linear position and a flexional position. The link side plate integrally includes: a front side plate portion connected to a longitudinally preceding link side plate to form a cable flexional inner circumferential side; a rear side plate portion connected to a longitudinally succeeding link side plate to form a cable flexional outer circumferential side; and, a flexible linkage portion interposed between the front and rear side plate portions. The rear side plate portion includes a first flexional outer circumferential end surface in an arc shape and provided on the cable flexional outer circumferential side, and, an arc center of the first flexional outer circumferential end surface longitudinally preceding a center of the linkage portion of the succeeding link side plate.

6 Claims, 13 Drawing Sheets

CABLE PROTECTION AND GUIDE DEVICE

CROSS REFERENCE TO RELATED APPLICATION

The disclosure of Japanese Patent Application No. 2012-033058, filed on Feb. 17, 2012 is incorporated by reference hereto in its entirety. This patent application claims priority to Japanese Patent Application No. 2012-033058, filed on Feb. 17, 2012.

FIELD OF THE INVENTION

The present invention relates to a cable protection and guide device which securely protects and guides a flexible cable, such as an electric cable for transmitting electric signals or supplying electricity or a hose for supplying oil or air pressure, that connects a movable portion and a fixed portion of an industrial machine, or a vehicle.

RELATED ART

In the prior art, there is known a cable protection and guide device (referred to simply as a "device" appropriately hereinafter) including a number of link frame bodies connected to each other in a longitudinal direction of a cable (referred to as a "cable longitudinal direction" or simply as "longitudinally" hereinafter). Each of the link frame bodies has a pair of link side plates provided so as to be spaced from each other in a lateral direction, and connecting arms respectively bridging over outer and inner sides of the pair of link side plates connected flexibly in the cable longitudinal direction (referred to as "a cable flexional outer circumferential side and a cable flexional inner circumferential side of the pair of link side plates" hereinafter), the device accommodating and guiding a cable at the interior of the link frame bodies from a cable fixed end to a cable movable end, the device being capable of taking a linear position in which the device is in contact with a support surface of a support, and a flexional position in which the device is spaced from the support surface as disclosed in Japanese Patent Application Laid-Open Nos. 2007-92939, 2007-247716, and 2004-527706 for example.

FIGS. 13A to 13C show a cable protection and guide device 500 as one example of such conventional cable protection and guide device.

Specifically, FIG. 13A illustrates a link side plate 510 of the cable protection and guide device 500 in the linear position, FIG. 13B illustrates the link side plate 510 at the beginning of flexion, and FIG. 13C is an enlarged view of a part 13C in FIG. 13B.

The conventional cable protection and guide device 500 is configured by a plurality of link side frames 510 connected in the cable longitudinal direction with flexible coupling members 520.

On a flexional outer circumferential side of the link side plate 510, a linear portion 511 and an arc-shaped portion 512 succeeding the linear position 511 in the cable longitudinal direction are formed.

When the device 500 is in the linear position, the linear portion 511 is in contact with a support surface 531 of a support 530 and is supported by the support surface 531.

Also, the arc-shaped portion 512 is provided on the flexional outer circumferential side at a position corresponding to the coupling member 520 at a rear side of the link side plate 510 in the cable longitudinal direction, and is formed in an arc shape whose arc center O5 is at a center M5 of the coupling member 520 in the cable longitudinal direction with a curvature radius r3 which is equal to the length from the coupling member 520 to the support surface 531 in the linear position.

The device 500 gradually moves to the flexional position starting from the link side plate 510 at a leading end in the cable longitudinal direction as the coupling members 520 are bent in order from front to back in the cable longitudinal direction.

SUMMARY OF THE INVENTION

Unfortunately, because the arc-shaped portion 512 is provided on the flexional outer circumferential side at the position corresponding to the coupling member 520 at the rear side of the link side plate 510 in the cable longitudinal direction, and is formed in the arc shape whose arc center O5 is at the center M5 of the coupling member 520 in the cable longitudinal direction with the curvature radius r3 which is equal to the length from the coupling member 520 to the support surface 531 in the linear position, the aforementioned conventional cable protection and guide device 500 has a problem that, as shown in FIG. 13B, the arc-shaped portion 512 comes in contact with the support surface 531 of the support 530 and slides on the support surface 531 generating abrasion powder when moving from the linear position to the flexional position.

Also, the device 500 has a problem that the arc-shaped portion 512 comes in contact with and slides on the support surface 531 generating abrasion powder when moving from the flexional position to the linear position as well.

The present invention has been made to address the above-mentioned problems of the prior art, and it is an object of the present invention to provide a cable protection and guide device which is capable of preventing abrasion powder that is otherwise generated when the link side plate slides on the support surface of the support while switching between the linear position and the flexional position.

In order to address the above-mentioned problems, according to a first aspect of the present invention, there is provided a cable protection and guide device having a number of link frame bodies connected to each other in a cable longitudinal direction, each link frame body includes: a pair of link side plates provided so as to be spaced from each other in a lateral direction; and, connecting arms respectively bridging over a cable flexional outer circumferential side and a cable flexional inner circumferential side of the pair of link side plates. The device accommodates and guides a cable at the interior of the link frame bodies from a cable fixed end to a cable movable end. The device being capable of taking a linear position in which the device is in contact with a support surface of a support, and a flexional position in which the device is spaced from the support surface. The device is characterized in that the link side plate integrally includes:

a front side plate portion connected to a longitudinally preceding link side plate to form the cable flexional inner circumferential side;

a rear side plate portion connected to a longitudinally succeeding link side plate to form the cable flexional outer circumferential side; and a flexible linkage portion interposed between the front side plate portion and the rear side plate portion and being flexible.

The rear side plate portion of the link side plate includes:

a first flexional outer circumferential end surface which is in an arc shape and provided on the cable flexional outer circumference side at a position corresponding to the linkage portion of the succeeding link side plate; and, an arc center of the first flexional outer circumferential end surface of the link side plate being provided so as to longitudinally precede a longitudinal center of the linkage portion of the succeeding link side plate.

According to a second aspect of the present invention, the rear side plate portion of the link side plate includes:

a second flexional outer circumferential end surface which is in an arc shape and provided on the cable flexional outer circumference side at a position corresponding to the linkage portion of the link side plate; and, an arc center of the second flexional outer circumferential end surface of the link side plate being provided so as to longitudinally succeed a longitudinal center of the linkage portion of the link side plate.

According to a third aspect of the present invention, there is provided a cable protection and guide device having a number of link frame bodies connected to each other in a cable longitudinal direction. Each link frame body includes:

a pair of link side plates provided so as to be spaced from each other in a lateral direction; and, connecting arms respectively bridging over a cable flexional outer circumferential side and a cable flexional inner circumferential side of the pair of link side plates.

The device accommodates and guides a cable at the interior of the link frame bodies from a cable fixed end to a cable movable end. The device being capable of taking a linear position in which the device is in contact with a support surface of a support, and a flexional position in which the device is spaced from the support surface. The device is characterized in that the link side plate integrally includes:

a front side plate portion connected to a longitudinally preceding link side plate to form the cable flexional outer circumferential side;

a rear side plate portion connected to a longitudinally succeeding link side plate to form the cable flexional inner circumferential side; and, a flexible linkage portion interposed between the front side plate portion and the rear side plate portion.

The front side plate portion of the link side plate includes:

a first flexional outer circumferential end surface which is in an arc shape and provided on the cable flexional outer circumference side at a position corresponding to the linkage portion of the link side plate; and, an arc center of the first flexional outer circumferential end surface of the link side plate being provided so as to longitudinally precede a longitudinal center of the linkage portion of the link side plate.

According to a fourth aspect of the present invention, the front side plate portion of the link side plate includes:

a second flexional outer circumferential end surface which is in an arc shape and provided on the cable flexional outer circumference side at a position corresponding to the linkage portion of the preceding link side plate; and, an arc center of the second flexional outer circumferential end surface of the link side plate being provided so as to longitudinally succeed a longitudinal center of the linkage portion of the preceding link side plate.

According to a fifth aspect of the present invention, a curvature radius of the first flexional outer circumferential end surface and a curvature radius of the second flexional outer circumferential end surface are equal to the length from the support surface of the support to the linkage portion of the link side plate which is in contact with the support surface.

Advantageous Effects of Invention

According to the first aspect of the cable protection and guide device:

a number of link frame bodies are connected to each other in a cable longitudinal direction each link frame body includes: a pair of link side plates provided so as to be spaced from each other in a lateral direction; and, connecting arms respectively bridging over a cable flexional outer circumferential side and a cable flexional inner circumferential side of the pair of link side plates.

The device accommodates and guides a cable in the interior of the link frame bodies from a cable fixed end to a cable movable end. The device is capable of taking a linear position in which the device is in contact with a support surface of a support, and, a flexional position in which the device is spaced from the support surface. The device is characterized in that the link side plate integrally includes:

a front side plate portion connected to a longitudinally preceding link side plate to form the cable flexional inner circumferential side;

a rear side plate portion connected to a longitudinally succeeding link side plate to form the cable flexional outer circumferential side; and, a flexible linkage portion interposed between the front side plate portion and the rear side plate portion.

The rear side plate portion of the link side plate includes a first flexional outer circumferential end surface which is in an arc shape and provided on the cable flexional outer circumference side at a position corresponding to the linkage portion of the succeeding link side plate. An arc center of the first flexional outer circumferential end surface of the link side plate is provided so as to longitudinally precede a longitudinal center of the linkage portion of the succeeding link side plate. When the linkage portion of the succeeding link side plate is bent from an original unbent state and the first flectional outer circumferential end surface of the rear side plate portion of the link side plate rotationally moves about a substantial center of the linkage portion of the succeeding link side plate, the arc center of the arc-shaped first flexional outer circumferential end surface of the link side plate moves toward the flexional inner circumferential side, or moves in a direction opposite to the support. This movement creates a gap between the first flexional outer circumferential end surface of the rear side plate portion of the link side plate and the support surface of the support as soon as the link side plate moves to the flexional position. Thus, it is possible to prevent the first flexional outer circumferential end surface of the rear side plate portion of the link side plate from sliding on the support surface of the support thus preventing generation of abrasion powder.

Similarly, because the gap exists between the first flexional outer circumferential end surface of the rear side plate portion of the link side plate and the support surface of the support until the linkage portion of the succeeding link side plate is unbent and because the rear side plate portion of the link side plate rotationally moves about the substantial center of the linkage portion of the succeeding link side plate to come in contact with the support surface of the support, it is possible to prevent the first flexional outer circumferential end surface of the rear side plate portion of the link side plate from sliding on the support surface of the support thus preventing generation of abrasion powder.

Furthermore, because the first flexional outer circumferential end surface of the rear side plate portion does not slide on the support surface of the support, it is possible to prevent noise that is otherwise generated when the first flexional outer circumferential end surface of the rear side plate portion slides on the support surface of the support.

According to second aspect of the cable protection and guide device:

the rear side plate portion of the link side plate includes a second flexional outer circumferential end surface which is in an arc shape and provided on the cable flexional outer circumference side at a position corresponding to the linkage portion of the link side plate; and, an arc center of the second flexional outer circumferential end surface of the link side plate is provided so as to longitudinally succeed a longitudinal center of the linkage portion of the link side plate.

Because the first flexional outer circumferential end surface of the rear side plate portion of the link side plate and the second flexional outer circumferential end surface of the rear side plate portion of the succeeding link side plate intersects (engages) each other without creating a difference in level in the lateral direction when the device moved to the flexional position, it is possible to make a flexional outer circumferential edge smoother and prevent peripheral objects from getting stuck into the device when moving back to the linear position.

Also, if there is a guide member on a side of the cable movable end for guiding the device in the linear position, the second flexional outer circumferential end surface of the rear side plate portion is prevented from sliding on the guide member thus preventing generation of abrasion powder. The sliding is prevented because a gap is created between the guide member and the second flexional outer circumferential end surface of the rear side plate portion of the link side plate when the device moves from the linear position to the flexional position on the side of the cable movable end.

According to third aspect of the cable protection and guide device:

a number of link frame bodies connected to each other in a cable longitudinal direction;

each link frame body includes: a pair of link side plates provided so as to be spaced from each other in a lateral direction; and, connecting arms respectively bridging over a cable flexional outer circumferential side and a cable flexional inner circumferential side of the pair of link side plates.

The device accommodates and guides a cable in the interior of the link frame bodies from a cable fixed end to a cable movable end. The device is capable of taking: a linear position in which the device is in contact with a support surface of a support; and, a flexional position in which the device is spaced from the support surface. The device is characterized in that the link side plate integrally includes: a front side plate portion connected to a longitudinally preceding link side plate to form the cable flexional outer circumferential side; a rear side plate portion connected to a longitudinally succeeding link side plate to form the cable flexional inner circumferential side; and a flexible linkage portion interposed between the front side plate portion and the rear side plate portion. The front side plate portion of the link side plate includes: a first flexional outer circumferential end surface which is in an arc shape and provided on the cable flexional outer circumference side at a position corresponding to the linkage portion of the link side plate; and, an arc center of the first flexional outer circumferential end surface of the link side plate is provided so as to longitudinally precede a longitudinal center of the linkage portion of the link side plate. When the linkage portion of the link side plate is bent from an original unbent state and the first flectional outer circumferential end surface of the front side plate portion of the link side plate rotationally moves about a substantial center of the linkage portion of the link side plate, the arc center of the arc-shaped first flexional outer circumferential end surface of the link side plate moves toward the flexional inner circumferential side, or moves in a direction opposite to the support. This movement creates a gap between the first flexional outer circumferential end surface of the front side plate portion of the link side plate and the support surface of the support as soon as the link side plate moves to the flexional position. The first flexional outer circumferential end surface of the front side plate portion of the link side plate is prevented from sliding on the support surface of the support thus preventing generation of abrasion powder.

Similarly, because the gap exists between the first flexional outer circumferential end surface of the front side plate portion of the link side plate and the support surface of the support until the linkage portion of the link side plate is unbent and the front side plate portion of the link side plate rotationally moves about the substantial center of the linkage portion of the link side plate to come in contact with the support surface of the support, the first flexional outer circumferential end surface of the front side plate portion of the link side plate is prevented from sliding on the support surface of the support to prevent generation of abrasion powder.

Furthermore, because the first flexional outer circumferential end surface of the front side plate portion does not slide on the support surface of the support, noise is prevented.

According to the fourth aspect of the cable protection and guide device:

the front side plate portion of the link side plate includes a second flexional outer circumferential end surface which is in an arc shape and provided on the cable flexional outer circumference side at a position corresponding to the linkage portion of the preceding link side plate; and, an arc center of the second flexional outer circumferential end surface of the link side plate is provided so as to longitudinally succeed a longitudinal center of the linkage portion of the preceding link side plate.

Because the first flexional outer circumferential end surface of the front side plate portion of the link side plate and the second flexional outer circumferential end surface of the front side plate portion of the succeeding link side plate intersects (engages) each other without creating a difference in level in the lateral direction when the device moved to the flexional position, the flexional outer circumferential edge is smoother and prevents peripheral objects from getting stuck in the device when moving back to the linear position.

Also, if there is a guide member on a side of the cable movable end for guiding the device in the linear position, the second flexional outer circumferential end surface of the front side plate portion is prevented from sliding on the guide member preventing generation of abrasion powder. A gap is created between the guide member and the second flexional outer circumferential end surface of the front side plate portion of the link side plate when the device moves from the linear position to the flexional position on the side of the cable movable end.

According to the fifth aspect of the cable protection and guide device, the curvature radius of the first flexional outer circumferential end surface and the curvature radius of the second flexional outer circumferential end surface are equal to the length from the support surface of the support to the linkage portion of the link side plate which is in contact with the support surface. A gap is created more reliably between the first flexional outer circumferential end surface and the support surface of the support when the linkage portion is bent from an original unbent state and the first flectional outer circumferential end surface rotationally moves about a substantial center of the linkage portion. Thus, the first flexional outer circumferential end surface is prevented from sliding on the support surface of the support to prevent generation of abrasion powder.

The flexional outer circumferential edge formed with the first flexional outer circumferential end surface and the second flexional outer circumferential end surface becomes smoother in the linear position and the flexional position. Thus, a neat appearance of the device is obtained and peripheral objects are prevented from being caught on an outer edge.

DESCRIPTION OF EMBODIMENTS

Figure 1:
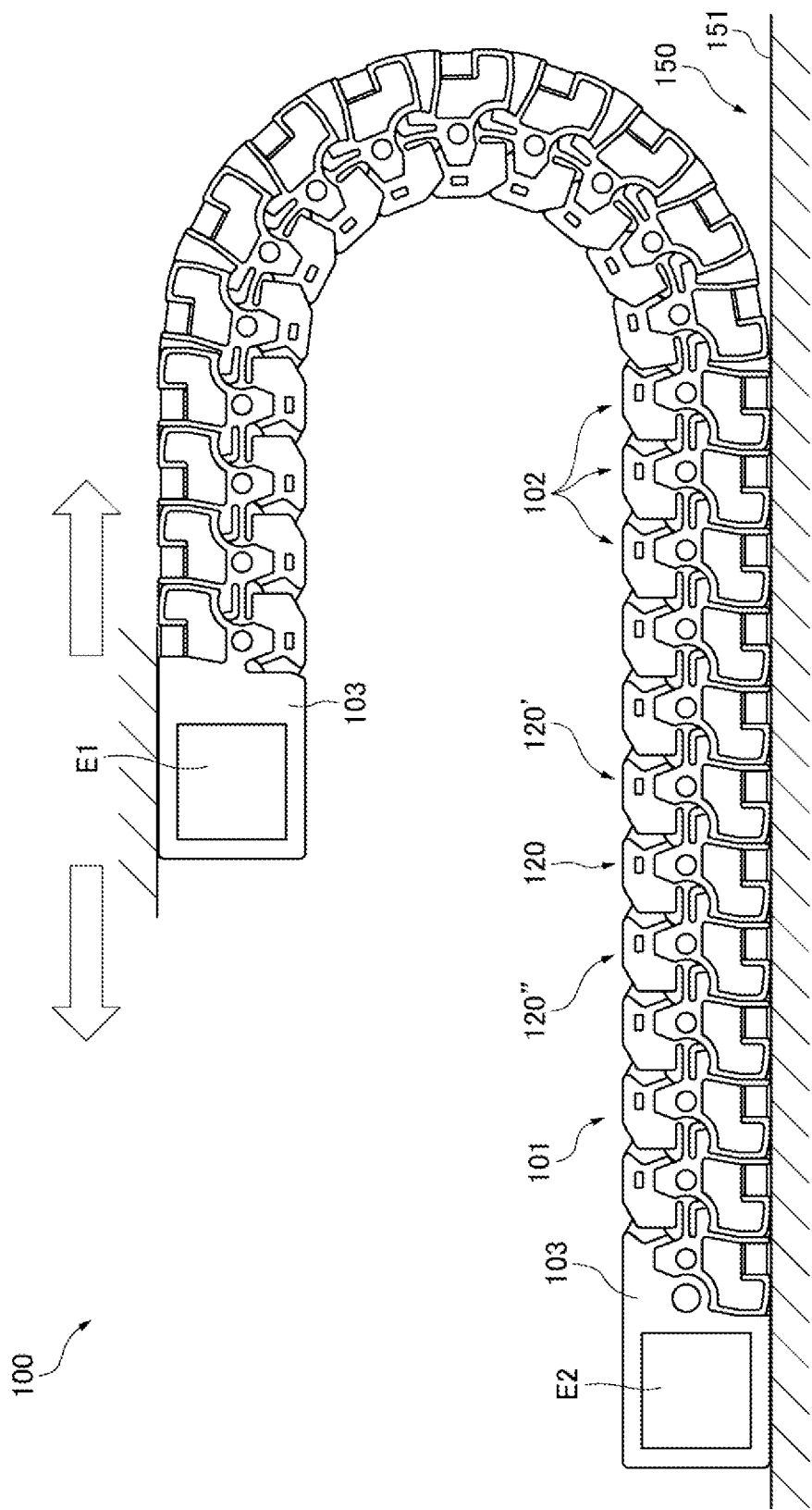
FIG. 1 is a schematic front view of a cable protection and guide device of a first embodiment of the present invention.

The cable protection and guide device of the present invention is not particularly limited as long as the device has a number of link frame bodies connected to each other in a cable longitudinal direction. Each link frame body includes: a pair of link side plates provided so as to be spaced from each other in a lateral direction; and, connecting arms respectively bridging over a cable flexional outer circumferential side and a cable flexional inner circumferential side of the pair of link side plates. The device accommodates and guides a cable in the interior of the link frame bodies from a cable fixed end to a cable movable end. The device is capable of taking a linear position in which the device is in contact with a support surface of a support. The device is capable of taking a flexional position in which the device is spaced from the support surface. The device is characterized in that each of the link side plates integrally includes: a front side plate portion connected to a longitudinally preceding link side plate to form the cable flexional inner circumferential side; a rear side plate portion connected to a longitudinally succeeding link side plate to form the cable flexional outer circumferential side; and a flexible linkage portion interposed between the front side plate portion and the rear side plate portion. The rear side plate portion of the link side plate includes: a first flexional outer circumferential end surface which is in an arc shape and provided on the cable flexional outer circumference side at a position corresponding to the linkage portion of the succeeding link side plate; and, an arc center of the first flexional outer circumferential end surface of the link side plate being provided so as to longitudinally precede a longitudinal center of the linkage portion of the succeeding link side plate.

The first flexional outer circumferential end surface of the link side plate is prevented from sliding on the support surface of the support to prevent generation of abrasion powder of the first flexional outer circumferential end surface of the link side plate.

The cable protection and guide device of the present invention is not particularly limited as long as it has a number of link frame bodies connected to each other in a cable longitudinal direction, each link frame body including: a pair of link side plates provided so as to be spaced from each other in a lateral direction; connecting arms respectively bridging over a cable flexional outer circumferential side and a cable flexional inner circumferential side of the pair of link side plates. The device accommodates and guides a cable in the interior of the link frame bodies from a cable fixed end to a cable movable end. The device is capable of taking a linear position in which the device is in contact with a support surface of a support. The device is capable of taking a flexional position in which the device is spaced from the support surface.

The device is characterized in that the link side plate integrally includes: a front side plate portion connected to a longitudinally preceding link side plate to form the cable flexional outer circumferential side; a rear side plate portion connected to a longitudinally succeeding link side plate to form the cable flexional inner circumferential side; and a flexible linkage portion interposed between the front side plate portion and the rear side plate portion.

The front side plate portion of the link side plate comprises:

a first flexional outer circumferential end surface which is in an arc shape and provided on the cable flexional outer circumference side at a position corresponding to the linkage portion of the link side plate; and, an arc center of the first flexional outer circumferential end surface of the link side plate being provided so as to longitudinally precede a longitudinal center of the linkage portion of the link side plate.

The first flexional outer circumferential end surface the link side plate is prevented from sliding on the support surface of the support to prevent generation of abrasion powder of the first flexional outer circumferential end surface of the link side plate.

For example, a material of the link side plate used in the cable protection and guide device of the present invention may be synthetic resin such as engineering resin or metal such as aluminum. The shape of the link side plate is not particularly limited as long as the link side plate can constitute a part of the link frame body and can be connected to another link side plate in a cable longitudinal direction. The cable is inserted into the interior of the link frame bodies and can be flexed backward in the cable longitudinal direction and is relatively moved between the cable fixed end and the cable movable end.

Also, the cable may be any flexible linear object, such as an electric cable or a hose that is used in a machine for supplying electricity, transmitting signals, or conducting material such as fluid.

First Embodiment

A cable protection and guide device 100 of a first embodiment of the present invention will now be described with reference to FIGS. 1 to 8B.

Figure 2:
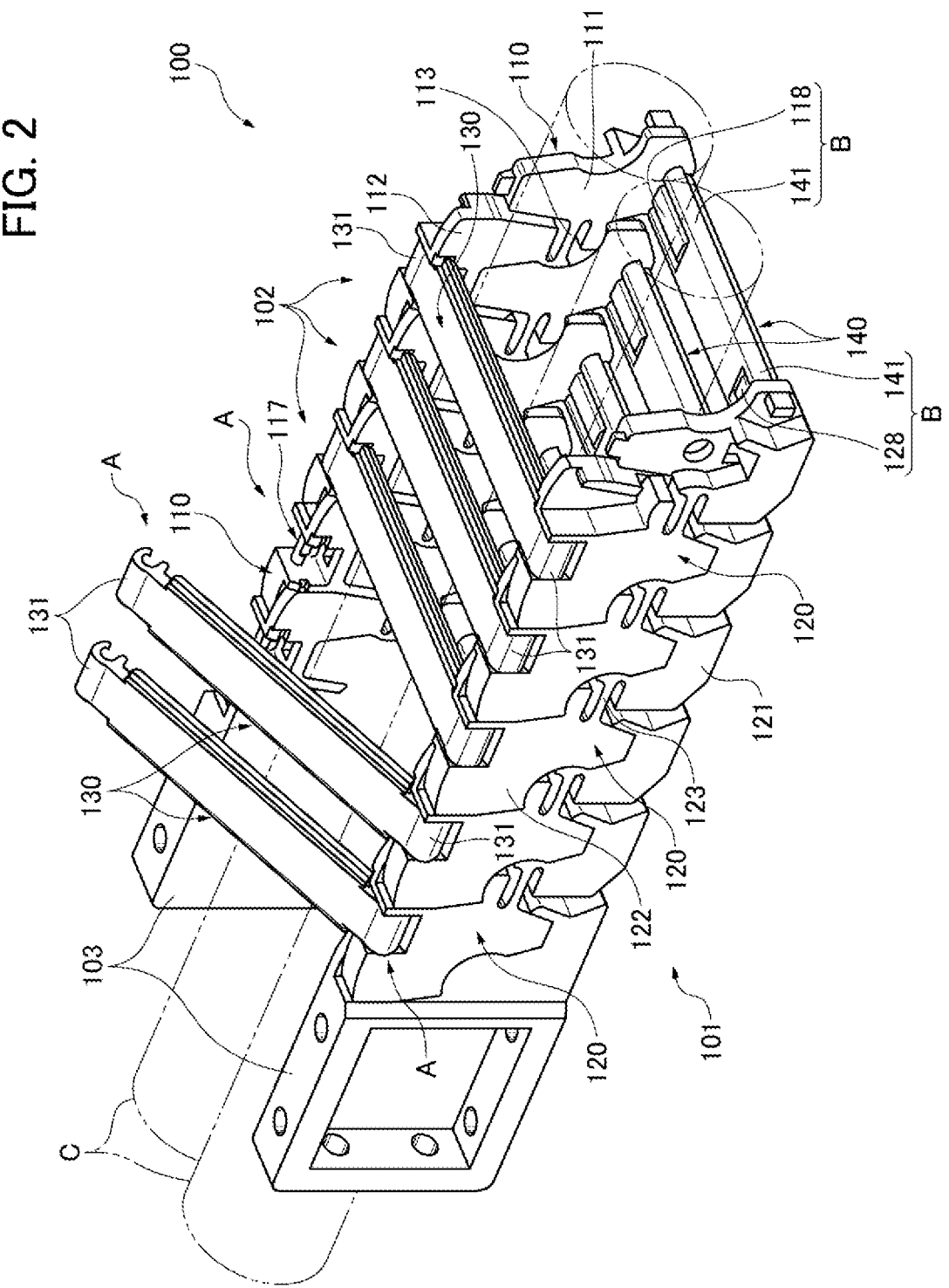
FIG. 2 is a perspective view of the cable protection and guide device of the first embodiment of the present invention.
Figure 3:
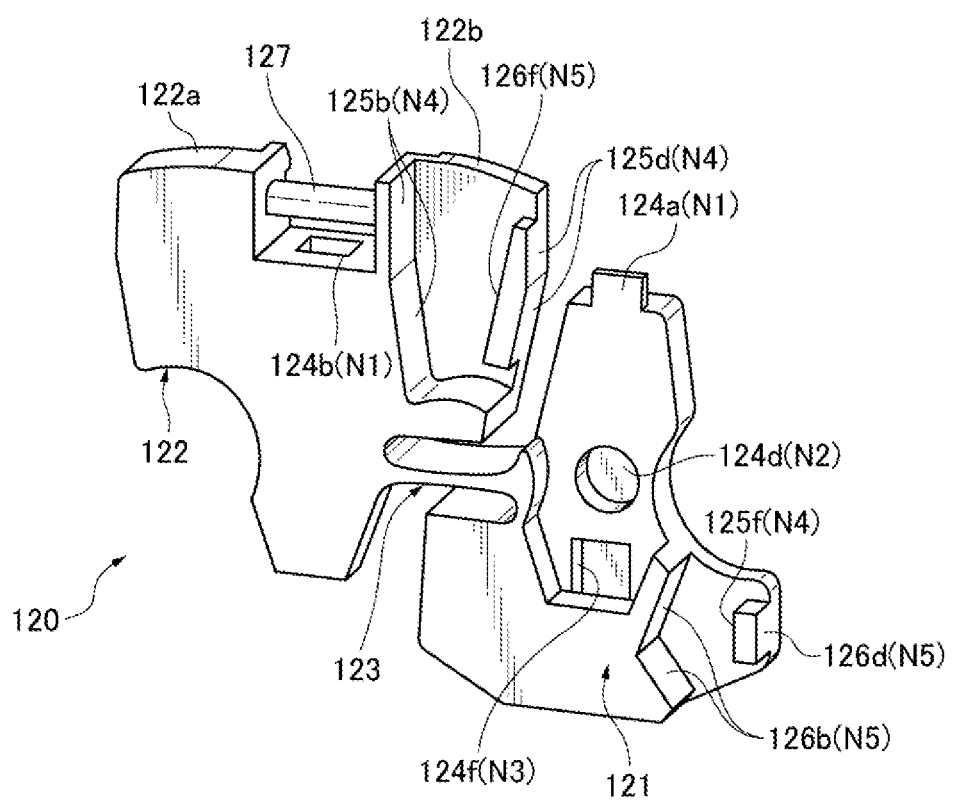
FIG. 3 is a perspective view of a second link side plate of the first embodiment of the present invention as seen from the outside thereof.
Figure 4:
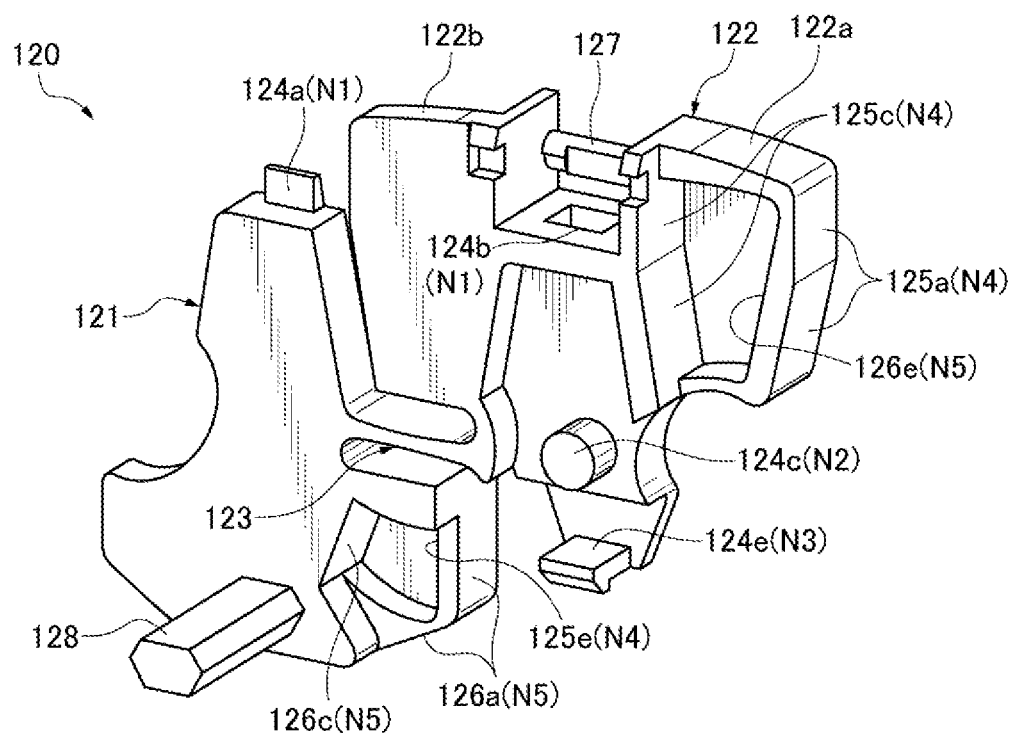
FIG. 4 is a perspective view of the second link side plate of the first embodiment of the present invention as seen from the inside thereof.
Figure 5:
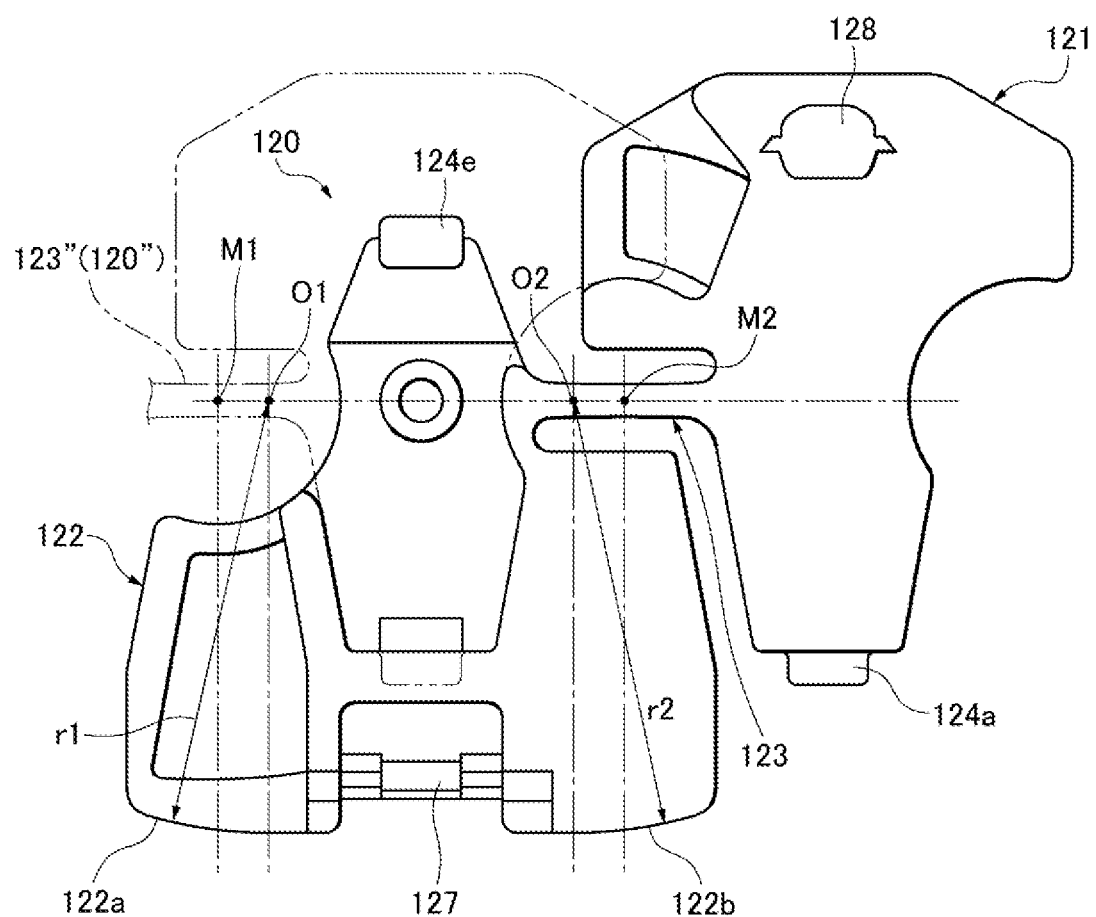
FIG. 5 is a view of the second link side plate of the first embodiment of the present invention as seen from the outside thereof.
Figure 6:
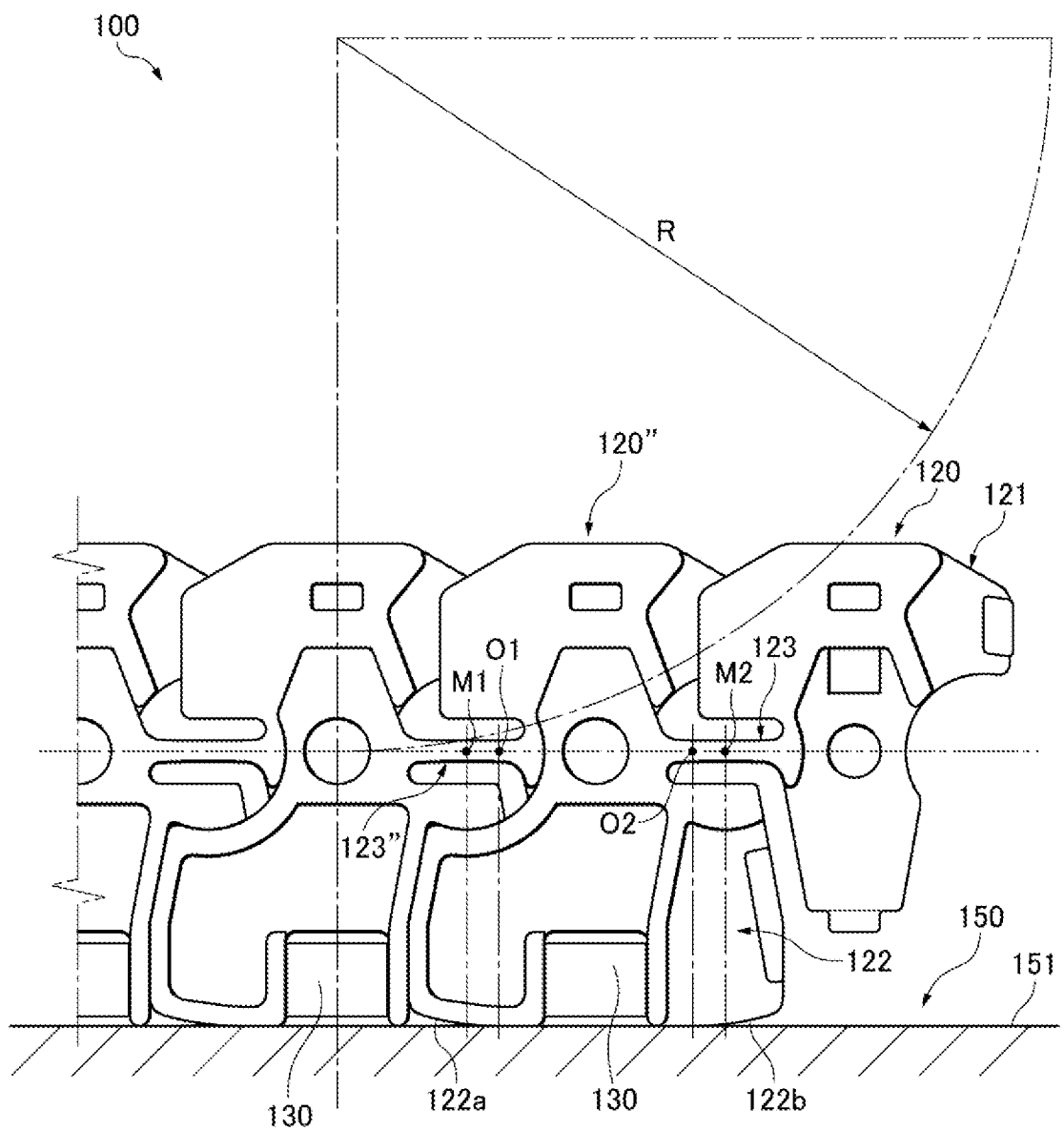
FIG. 6 is a view of the cable protection and guide device of the first embodiment of the present invention in a linear position.
Figure 7A:
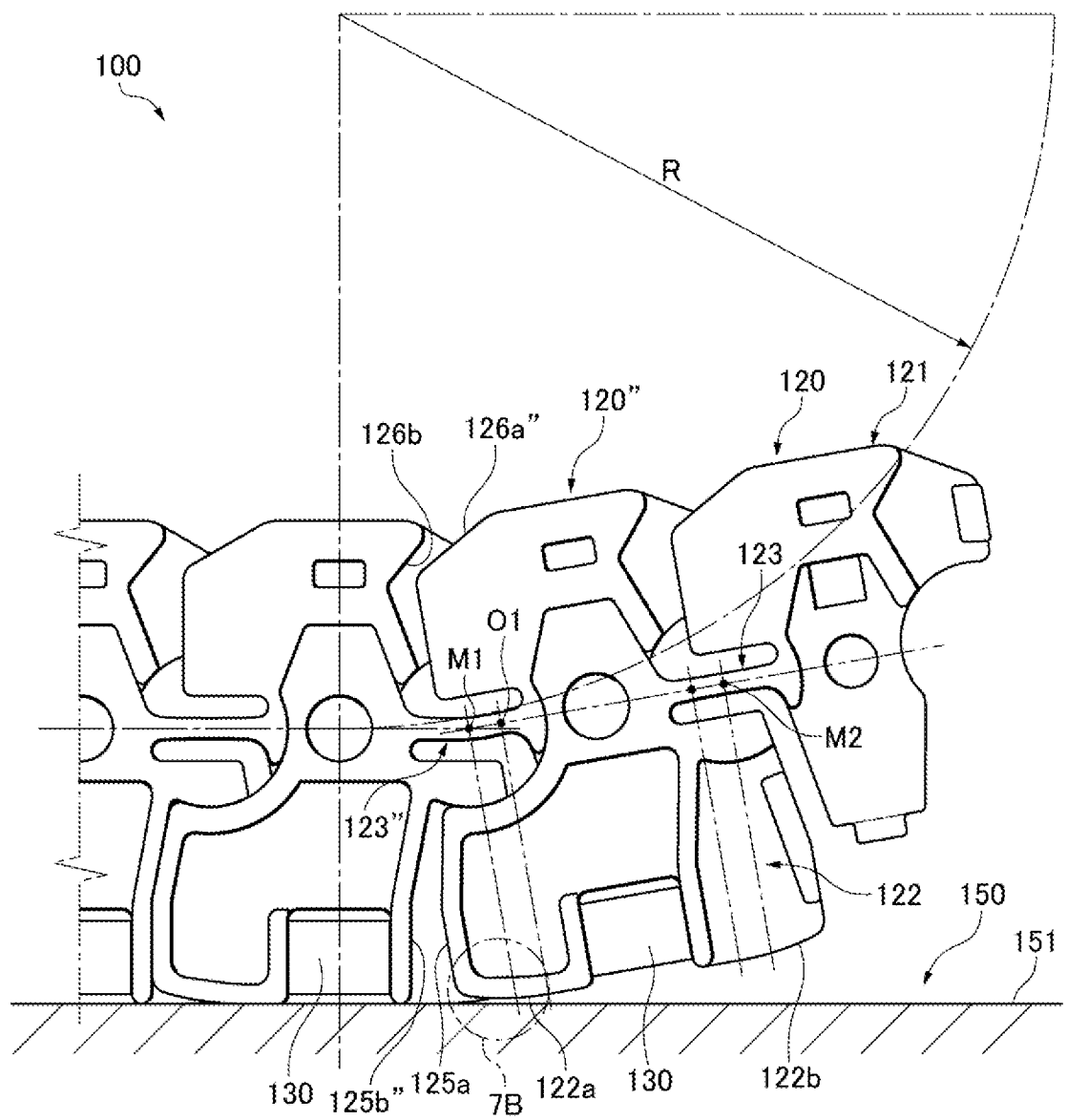
FIG. 7A is a view of the cable protection and guide device of the first embodiment of the present invention at the beginning of flexion.
Figure 7B:
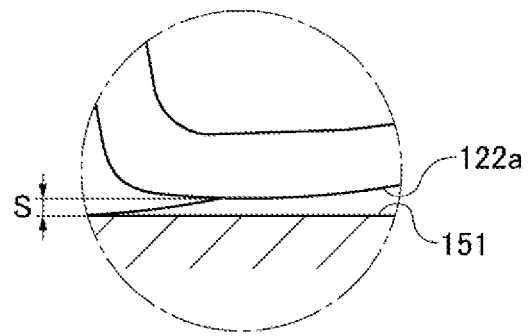
FIG. 7B is an enlarged view of a part 7B shown in FIG. 7A.
Figure 8A:
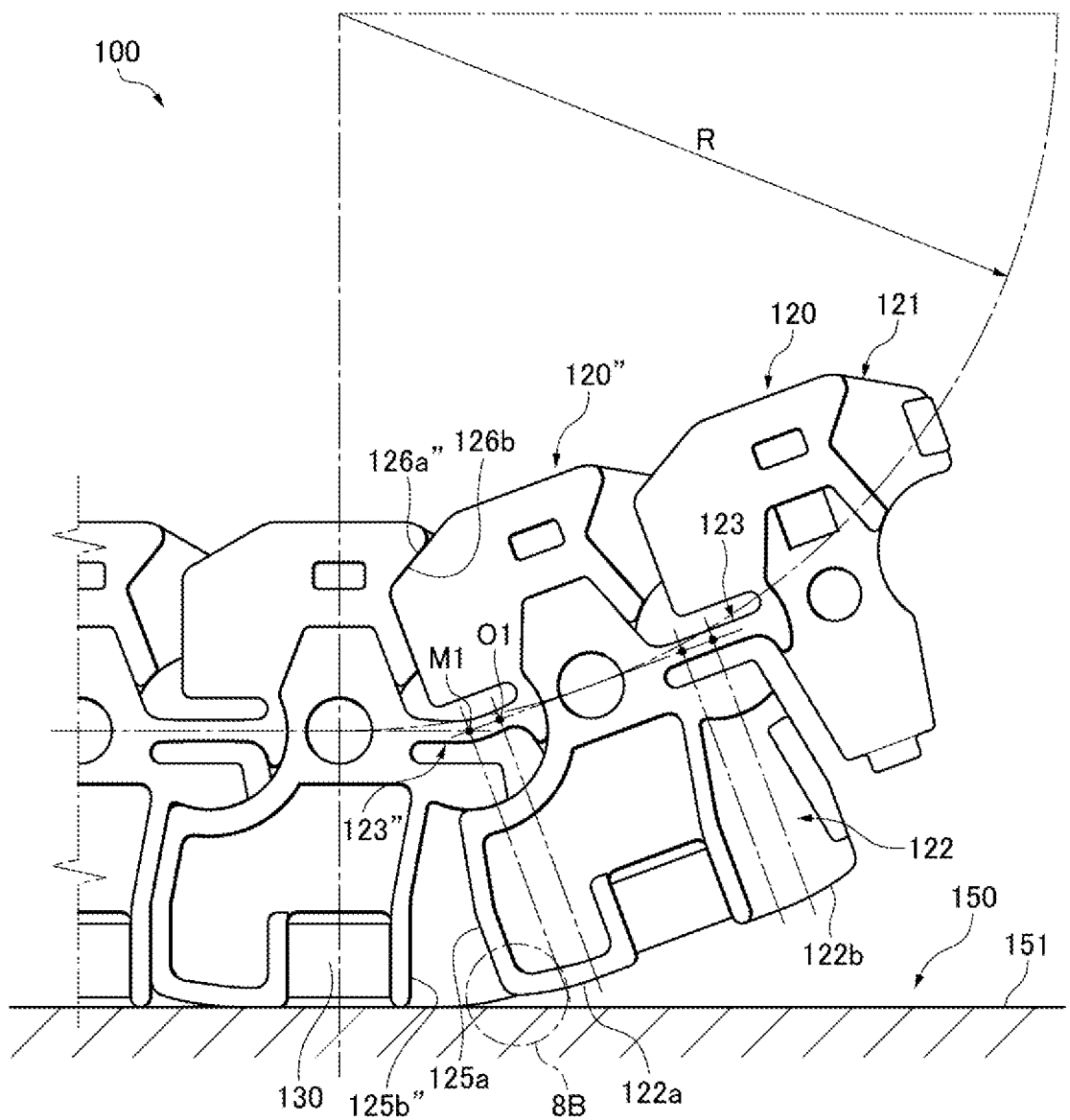
FIG. 8A is a view of the cable protection and guide device of the first embodiment of the present invention in a flexional position.
Figure 8B:
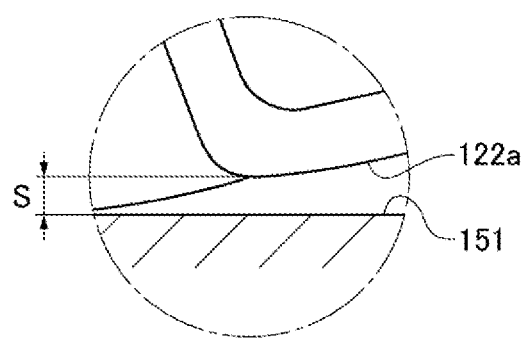
FIG. 8B is an enlarged view of a part 8B shown in FIG. 8A.

FIG. 1 is a schematic front view of the cable protection and guide device 100 of the first embodiment of the present invention. FIG. 2 is a perspective view of the cable protection and guide device 100 of the first embodiment of the present invention. FIG. 3 is a perspective view of a second link side plate 120 of the first embodiment of the present invention as seen from the outside thereof. FIG. 4 is a perspective view of the second link side plate 120 of the first embodiment of the present invention as seen from the inside thereof. FIG. 5 is a view of the second link side plate 120 of the first embodiment of the present invention as seen from the outside thereof. FIG. 6 is a view of the cable protection and guide device 100 of the first embodiment of the present invention in a linear position. FIG. 7A is a view of the cable protection and guide device 100 of the first embodiment of the present invention at the beginning of flexion. FIG. 7B is an enlarged view of a part 7B shown in FIG. 7A. FIG. 8A is a view of the cable protection and guide device 100 of the first embodiment of the present invention in a flexional position and FIG. 8B is an enlarged view of a part 8B shown in FIG. 8A.

As shown in FIGS. 1 to 8B, the cable protection and guide device 100 of the first embodiment of the present invention is provided in a machine (not shown) that includes a cable C, and is used for protecting and guiding the cable C.

The machine may be semiconductor production equipment, pharmaceutical development and test equipment, a vehicle door opening and closing device, or a machine tool.

The device 100 has a number of link frame bodies connected to each other in a cable longitudinal direction. Each of the link frame bodies includes: a pair of link plates, namely, a first link side plate 110 and a second link side plate 120 provided so as to be spaced from each other in a lateral direction; a first connecting arm 130 bridging over a cable flexional outer circumferential side of the first link side plate 110 and the second link side plate 120; and, a second connecting arm 140 bridging over a cable flexional inner circumferential side of the first link side plate 110 and the second link side plate 120. The device 100 accommodates and guides the cable C at the interior of the link frame bodies from a cable fixed end E2 to a cable movable end E1. The device 100 is capable of taking a linear position in which the device 100 is in contact with a support surface 151 of a support 150. The device is capable of taking a flexional position in which the device 100 is spaced from the support surface 151.

Specifically, as shown in FIG. 1, the cable fixed end E2 of the device 100 is connected to a stationary portion of the machine via a mounting portion 103, and the cable movable end E1 of the device 100 is connected to a movable portion of the machine via a mounting portion 103. The device 100 is flexible so as to substantially wholly or substantially partially take the linear position or the flexional position in accordance with the movement of the cable C between the movable portion and the stationary portion.

The device 100 includes a link row group 101 consisting of a plurality of link rows 102 arranged and flexibly connected to each other in the cable longitudinal direction. The device includes a plurality of the first connecting arms 130, and a plurality of the second connecting arms 140.

Each link row 102 consists of a pair of the first and second link side plates 110 and 120 provided so as to be spaced from each other in a lateral direction.

The first connecting arm 130 connects the first link side plate 110 and the second link side plate 120 at the cable flexional outer circumferential side, and is detachably mounted to the first link side plate 110 and the second link side plate 120 with a mounting structure A.

The mounting structure A consists of hinge shafts 117 and 127 respectively formed on a pair of the first link side plate 110 and the second link side plate 120, and hooks 131, 131 formed on the first connecting arm 130 at both ends thereof.

The second connecting arm 140 connects a pair of the first link side plate 110 and the second link side plate 120 at the cable flexional inner circumferential side, and is detachably mounted to the first link side plate 110 and the second link side plate 120 with a mounting structure B.

The mounting structure B consists of engaging portions 118 and 128 respectively formed on the first link side plate 110 and the second link side plate 120, and arm engaging portions 141 and 141 formed on the second connecting arm 140.

A pair of link plates, namely, the first link side plate 110 and the second link side plate 120 will now be described.

In the first embodiment, each second link side plate 120 (first link side plate 110) of the pair of first and second link side plates 110 and 120 integrally includes:

a front side plate portion 121 (111) which is connected to a preceding second link side plate 120' (first link side plate 110') in the cable longitudinal direction to form the cable flexional inner circumferential side;

a rear side plate portion 122 (112) which is connected to a succeeding second link side plate 120" (first link side plate 110") to form the cable flexional outer circumferential side; and, a flexible linkage portion 123 (113) which is interposed between the front side plate portion 121 (111) and the rear side plate portion 122 (112).

Because the first link side plate 110 and the second link side plate 120 are bilaterally symmetrical with respect to an axis in the cable longitudinal direction, only the second link side plate 120 will be described with reference to FIGS. 3 to 5 to avoid duplicate description of the first link side plate 110.

Also, for the purpose of simplicity, in this description, a preceding second link side plate of the second link side plate 120 (that is, a second link side plate connected to the second link side plate 120 at a front side of the second link side plate 120 in the cable longitudinal direction) will be identified as 120', while a succeeding second link side plate of the second link side plate 120 (that is, a second link side plate connected to the second link side plate 120 at a rear side of the second link side plate 120 in the longitudinal direction) will be identified as 120".

Furthermore, a single quotation mark "'" and a double quotation mark """ will be used for reference numerals that identify elements of the preceding second link side plate 120' and the succeeding second link side plate 120", respectively.

Also, specific illustration will be avoided for elements of the preceding second link side plate 120' and the succeeding link side plate 120" when positions and shapes of those elements can be perceived from the illustration of corresponding elements of the second link side plate 120.

The second link side plate 120 includes first to third connecting structures N1 to N3 for connecting to the second link side plate 120' which is adjacent thereto in the cable longitudinal direction.

The first connecting structure N1 consists of a first fitting convex portion 124a provided on the front side plate portion 121 and a first fitting concave portion 124b provided on the rear side plate portion 122. The first fitting convex portion 124a of the front side plate portion 121 of the second link side plate 120 fits to a first fitting concave portion 124b' of a rear side plate portion 122' of the preceding second link side plate 120'.

Similarly, the second connecting structure N2 consists of a second fitting concave portion 124d provided on the front side plate portion 121 and a second fitting convex portion 124c provided on the rear side plate portion 122. The second fitting concave portion 124d of the front side plate portion 121 of the second link side plate 120 fits to a second fitting convex portion 124c' of the rear side plate portion 122' of the preceding second link side plate 120'.

Furthermore, the third connecting structure N3 consists of a third fitting concave portion 124f provided on the front side plate portion 121 and formed in a shape into which a claw can hook, and a third fitting convex portion 124e provided on the rear side plate portion 122 and formed in a shape of the claw. The third fitting concave portion 124f of the front side plate portion 121 of the second link side plate 120 fits to a third fitting convex portion 124e' of the rear side plate portion 122' of the preceding second link side plate 120' such that the claw of the third fitting convex portion 124e' hooks into the third fitting concave portion 124f.

In this way, a plurality of the second link side plates 120 are consecutively connected in the cable longitudinal direction.

The second link side plate 120 also includes a linear position holding structure N4 for holding the device 100 in the linear position, and a flexional position restricting structure N5 for restricting the flexional position of the device 100 at a maximum flexional position.

The maximum flexional position is a position in which the device 100 is flexed on the basis of the linkage portions 123 with a flexion radius R shown in FIGS. 6 to 8B.

The linear position holding structure N4 consists of first to sixth linear position holding surfaces 125a to 125f. The first linear position holding surface 125a, the second linear position holding surface 125b, the third linear position holding surface 125c, and the fourth linear position holding surface 125d are provided on the rear side plate portion 122, and the fifth linear position holding surface 125e and the sixth linear position holding surface 125f are provided on the front side plate portion 121.

In the linear position, the sixth linear position holding surface 125f of the front side plate portion 121 of the link side plate 120 is in surface contact with a fifth linear position holding surface 125e' of a front side plate portion 121' of the preceding second link side plate 120', the second linear position holding surface 125b of the rear side plate portion 122 of the second link side plate 120 is in surface contact with a first linear position holding surface 125a' of the rear side plate portion 122' of the preceding second link side plate 120', and the fourth linear position holding surface 125d of the rear side plate portion 122 of the second link side plate 120 is in surface contact with a third linear position holding surface 125c' of the rear side plate portion 122' of the preceding second link side plate 120'.

This configuration enables holding of the linear position of the device 100.

The flexional position restricting structure N5 consists of first to sixth flexional position restricting surfaces 126a to 126f. The first flexional position restricting surface 126a, the second flexional position restricting surface 126b, the third flexional position restricting surface 126c, and the fourth flexional position restricting surface 126d are provided on the front side plate portion 121, and the fifth flexional position restricting surface 126e and the sixth flexional position restricting surface 126f are provided on the rear side plate portion 122.

In the maximum flexional position, the second flexional position restricting surface 126b of the front side plate portion 121 of the link side plate 120 is in surface contact with a first flexional position restricting surface 126a' of the front side plate portion 121' of the preceding second link side plate 120', the fourth flexional position restricting surface 126d of the front side plate portion 121 of the second link side plate 120 is in surface contact with a third flexional position restricting surface 126c' of the front side plate portion 121' of the preceding second link side plate 120', and the sixth flexional position restricting surface 126f of the rear side plate portion 122 of the second link side plate 120 is in surface contact with a fifth flexional position restricting surface 126e' of the rear side plate portion 122' of the preceding second link side plate 120'.

This configuration enables restriction of the flexional position of the device 100.

In the first embodiment, the rear side plate portion 122 of the second link side plate 120 includes a first flexional outer circumferential end surface 122a which is in an arc shape (arc-shaped) and provided on the cable flexional outer circumference side at a position corresponding to a linkage portion 123" of the succeeding second link side plate 120". An arc center O1 of the first flexional outer circumferential end surface 122a of the second link side plate 120 is provided so as to longitudinally precede a longitudinal center M1 of the linkage portion 123" of the longitudinally succeeding second link side plate 120", as shown in FIG. 5.

With this configuration, when the linkage portion 123" of the succeeding second link side plate 122" is bent from an original unbent state and the first flectional outer circumferential end surface 122a of the rear side plate portion 122 of the second link side plate 120 rotationally moves about a substantial center of the linkage portion 123" of the succeeding second link side plate 120", a gap S (see FIGS. 7B and 8B) is created between the first flexional outer circumferential end surface 122a of the rear side plate portion 122 of the second link side plate 120 and the support surface 151 of the support 150.

Also, the rear side plate portion 122 of the second link side plate 120 includes a second flexional outer circumferential end surface 122b which is in an arc shape and provided on the cable flexional outer circumference side at a position corresponding to the linkage portion 123 of the second link side plate 120 such that an arc center O2 of the second flexional outer circumferential end surface 122b of the second link side plate 120 is provided so as to longitudinally succeed a longitudinal center M2 of the linkage portion 123 of the second link side plate 120.

With this configuration, when the device 100 moves to the flexional position, the first flexional outer circumferential end surface 122a of the rear side plate portion 122 of the second link side plate 120 and a second flexional outer circumferential end surface 122b" of the rear side plate portion 122" of the succeeding second link side plate 120" intersect (engages) each other without creating a difference in level in the lateral direction.

Also, a curvature radius r1 of the first flexional outer circumferential end surface 122a and a curvature radius r2 of the second flexional outer circumferential end surface 122b is equal to the length from the support surface 151 of the support 150 to the linkage portion 123 of the second link side plate 120 which is in contact with the support surface 151.

With this configuration, when the linkage portion 123" is bent from an original unbent state and the first flexional outer circumferential end surface 122a rotationally moves about the substantial center of the linkage portion 123":

gap S (see FIGS. 7B and 8B) is created more reliably between the first flexional outer circumferential end surface 122a and the support surface 151 of the support 150; and, a flexional outer circumferential edge formed with the first and second flexional outer circumferential end surfaces 122a and 122b" becomes smoother in the linear and flexional positions.

The relationship between the first flexional outer circumferential end surface 122a of the rear side plate portion 122 and the support surface 151 of the support 150 when the device 100 moves from the linear position to the flexional position will now be described in detail with reference to FIGS. 6 to 8B.

As shown in FIG. 6, when the device 100 is in the linear position, a flexional outer circumferential side surface of the rear side plate portion 122 of the second link side plate 120 is in surface contact with the support surface 151 of the support 150.

At this point, the arc-shaped first flexional outer circumferential end surface 122a of the rear side plate portion 122 of the second link side plate 120 is slightly in contact with the support surface 151 of the support 150 at a front portion thereof in the cable longitudinal direction.

As shown in FIG. 7A, as the cable movable end E1 (see FIG. 1) moves from the state shown in FIG. 6, the device 100 gradually moves to the flexional position from a front side thereof in the cable longitudinal direction.

Specifically, as the linkage portion 123" of the succeeding second link side plate 120" connected to the second link side plate 120 is bent, the first linear position holding surface 125a of the rear side plate portion 122 of the second link side plate 120 moves away from the second linear position holding surface 125b" of the rear side plate portion 122" of the succeeding second link side plate 120" and a first flexional position restricting surface 126a" of the front side plate portion 121" of the succeeding second link side plate 120" comes closer to a second flexional position restricting surface (126b) of a front side plate portion (121) of another succeeding second link side plate (120).

At this point, because the arc center O1 of the arc-shaped first flexional outer circumferential end surface 122a is provided so as to longitudinally precede the longitudinal center M1 of the linkage portion 123" of the succeeding second link side plate 120" as described above, the arc center O1 of the arc-shaped first flexional outer circumferential end surface 122a moves upward to the flexional inner circumferential side (or moves in a direction opposite to the support 150) to create the gap S between first rear flexional outer circumferential end surface 122a of the second link side plate 120 and the support surface 151 of the support 150 as soon as the second link side plate 120 moves to the flexional position.

As shown in FIG. 8A, as the cable movable end E1 further moves from the state shown in FIG. 7A, the device 100 further moves to the flexional position at the front side thereof in the cable longitudinal direction.

Specifically, as the linkage portion 123" of the succeeding second link side plate 120" connected to the second link side plate 120 is further bent, the first linear position holding surface 125a of the rear side plate portion 122 of the second link side plate 120 further moves away from the second linear position holding surface 125b" of the rear side plate portion 122" of the succeeding second link side plate 120" and the first flexional position restricting surface 126a" of the front side plate portion 121" of the succeeding second link side plate 120" comes in contact with the second flexional position restricting surface (126b) of the front side plate portion (121) of the another succeeding second link side plate (120).

At this point, the second link side plate 120 further moves to the flexional position and the arc center O1 of the arc-shaped first flexional outer circumferential end surface 122a further moves upward to the flexional inner circumferential side (or moves in a direction opposite to the support 150) to increase the gap S that was created between the first flexional outer circumferential end surface 122a of the second link side plate 120 and the support surface 151 of the support 150.

In other words, the first flexional outer circumferential end surface 122a of the rear side plate portion 122 does not slide on the support surface 151 of the support 150.

Also, when the device 100 moves back from the flexional position shown in FIG. 8A to the linear position shown in FIG. 6, the gap S exists between the first flexional outer circumferential end surface 122a of the rear side plate portion 122 of the second link side plate 120 and the support surface 151 of the support 150 until the linkage portion 123" of the succeeding second link side plate 120" is unbent and the rear side plate portion 122 of the second link side plate 120 rotationally moves about the substantial center of the linkage portion 123" of the succeeding second link side plate 120" to come in contact with the support surface 151 of the support 150.

If there is a guide member (not shown) on a side of the cable movable end E1 for guiding the device 100 in the linear position, the gap S is created between the guide member and the second flexional outer circumferential end surface 122b of the rear side plate portion 122 of the second link side plate 120 when the device 100 moves from the linear position to the flexional position on the side of the cable movable end E1.

In other words, the same effect can be achieved between the second flexional outer circumferential end surface 122b of the rear side plate portion 122 and the guide member as between the first flexional outer circumferential end surface 122a of the rear side plate portion 122 and the support surface 151 of the support 150.

The second link side plate 120 (first link side plate) integrally includes:

the front side plate portion 121 connected to the longitudinally preceding second link side plate 120' (first link side plate) to form the cable flexional inner circumferential side the rear side plate portion 122 connected to the longitudinally succeeding second link side plate 120" (first link side plate) to form the cable flexional outer circumferential side; and, the flexible linkage portion 123 is interposed between the front side plate portion 121 and the rear side plate portion 122.

The rear side plate portion 122 of the second link side plate 120 (first link side plate) includes the first flexional outer circumferential end surface 122a which is in the arc shape and provided on the cable flexional outer circumference side at the position corresponding to the linkage portion 123" of the succeeding second link side plate 120" (first link side plate). The arc center O1 of the first flexional outer circumferential end surface 122a of the second link side plate 120 (first link side plate) is provided so as to longitudinally precede the longitudinal center M1 of the linkage portion 123" of the succeeding second link side plate 120" (first link side plate). The first flexional outer circumferential end surface 122a of the rear side plate portion 122 is prevented from sliding on the support surface 151 of the support 150 to prevent generation of abrasion powder and to prevent noise.

Also, because the rear side plate portion 122 of the second link side plate 120 (first link side plate) includes the second flexional outer circumferential end surface 122b which is in the arc shape and provided on the cable flexional outer circumference side at the position corresponding to the linkage portion 123 of the second link side plate 120 (first link side plate), the arc center O2 of the second flexional outer circumferential end surface 122b of the second link side plate 120 (first link side plate) is provided so as to longitudinally succeed the longitudinal center M2 of the linkage portion 123 of the second link side plate 120 (first link side plate). The first flexional outer circumferential edge is smoother and prevents peripheral objects from getting stuck in the device 100 when moving back to the linear position.

The curvature radius r1 of the first flexional outer circumferential end surface 122a and the curvature radius r2 of the second flexional outer circumferential end surface 122b are equal to the length from the support surface 151 of the support 150 to the linkage portion 123 of the second link side plate 120 (first link side plate) which is in contact with the support surface 151. Thus, the first flexional outer circumferential end surface 122a does not slide on the support surface 151 of the support 150 and generation of abrasion powder is prevented and objects are prevented from being caught on an outer edge.

Second Embodiment

A cable protection and guide device 200 of a second embodiment of the present invention will now be described with reference to FIGS. 9 to 12B.

Figure 9:
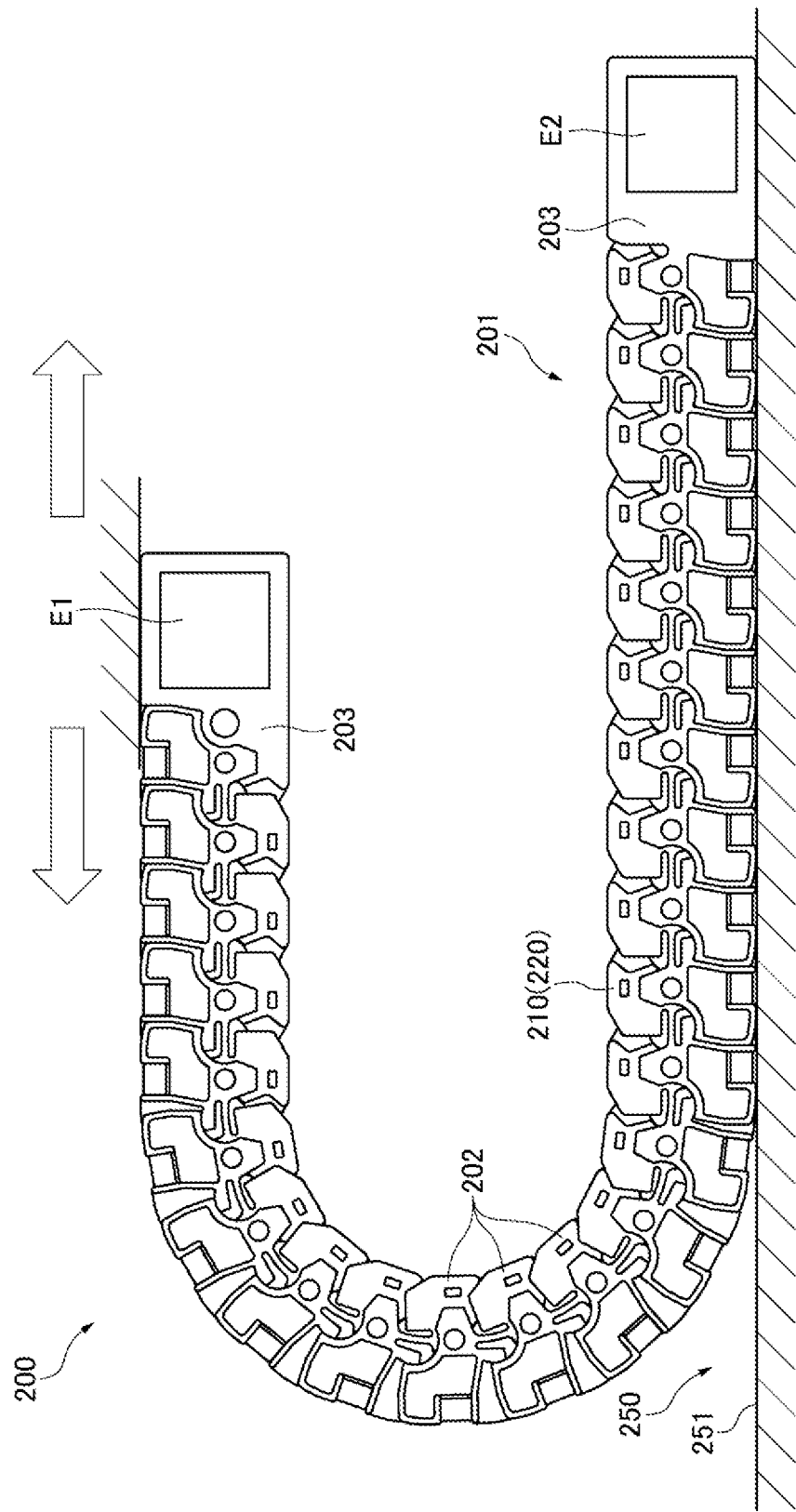
FIG. 9 is a schematic front view of a cable protection and guide device of a second embodiment of the present invention.
Figure 10:
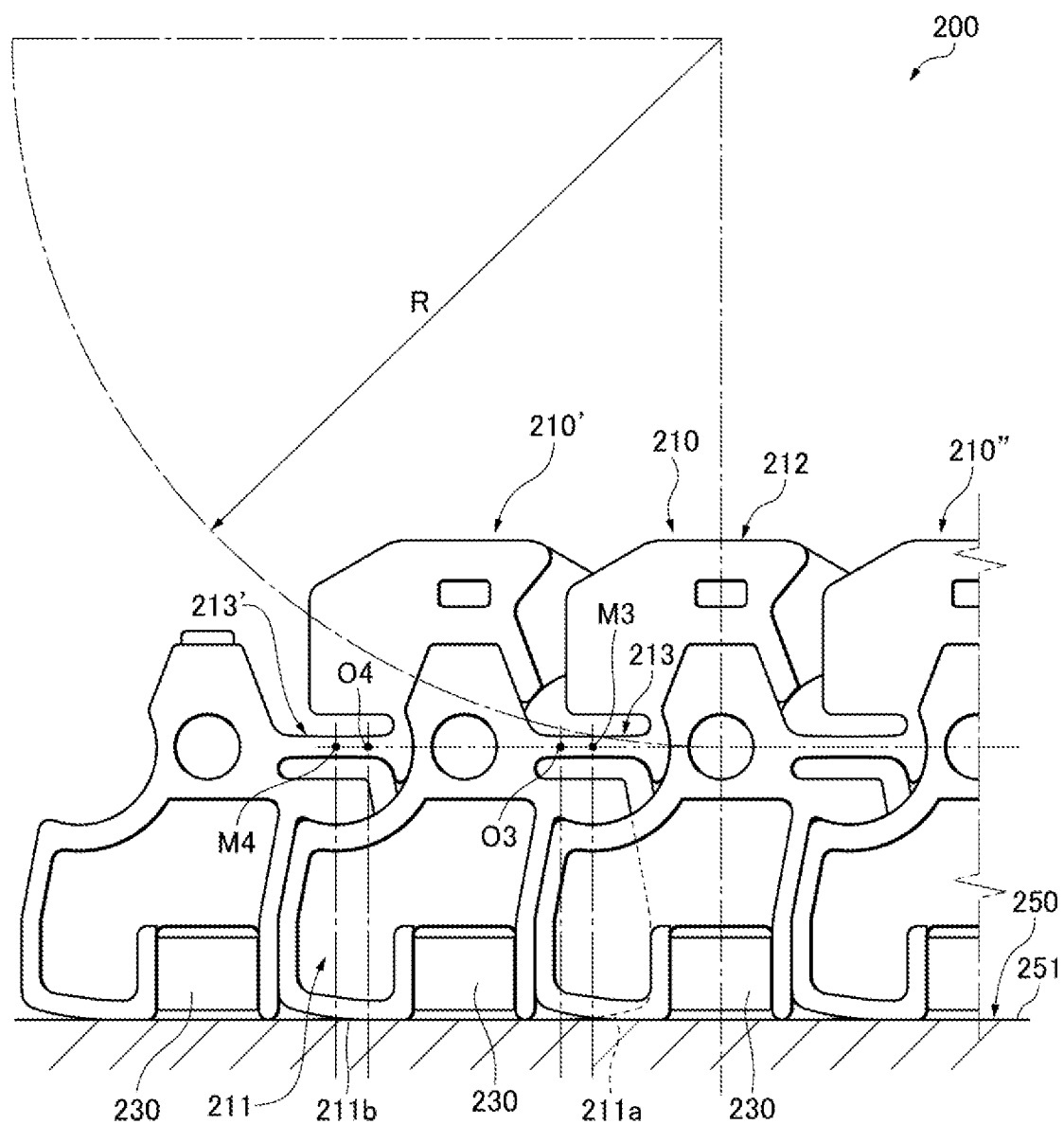
FIG. 10 is a view of the cable protection and guide device of the second embodiment of the present invention in a linear position.
Figure 11A:
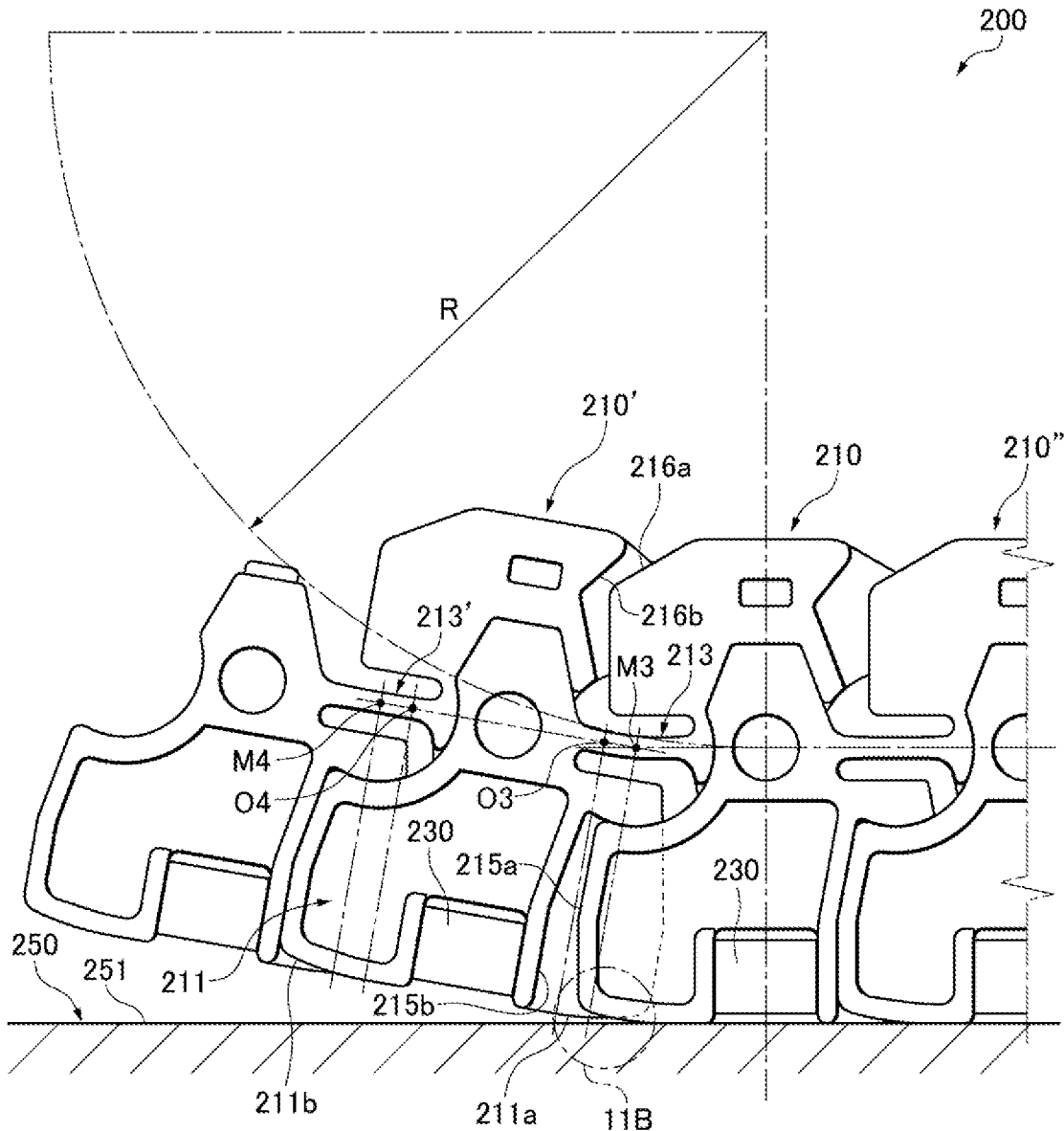
FIG. 11A is a view of the cable protection and guide device of the second embodiment of the present invention at the beginning of flexion.
Figure 11B:
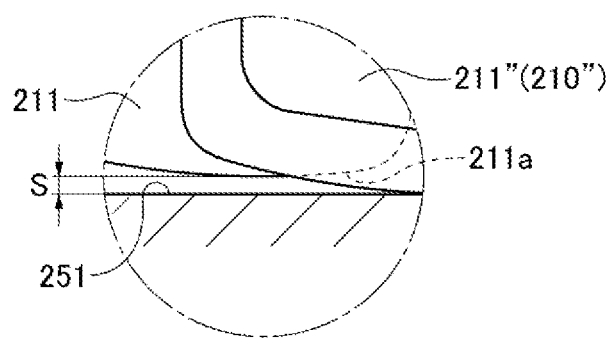
FIG. 11B is an enlarged view of a part 11B shown in FIG. 11A.
Figure 12A:
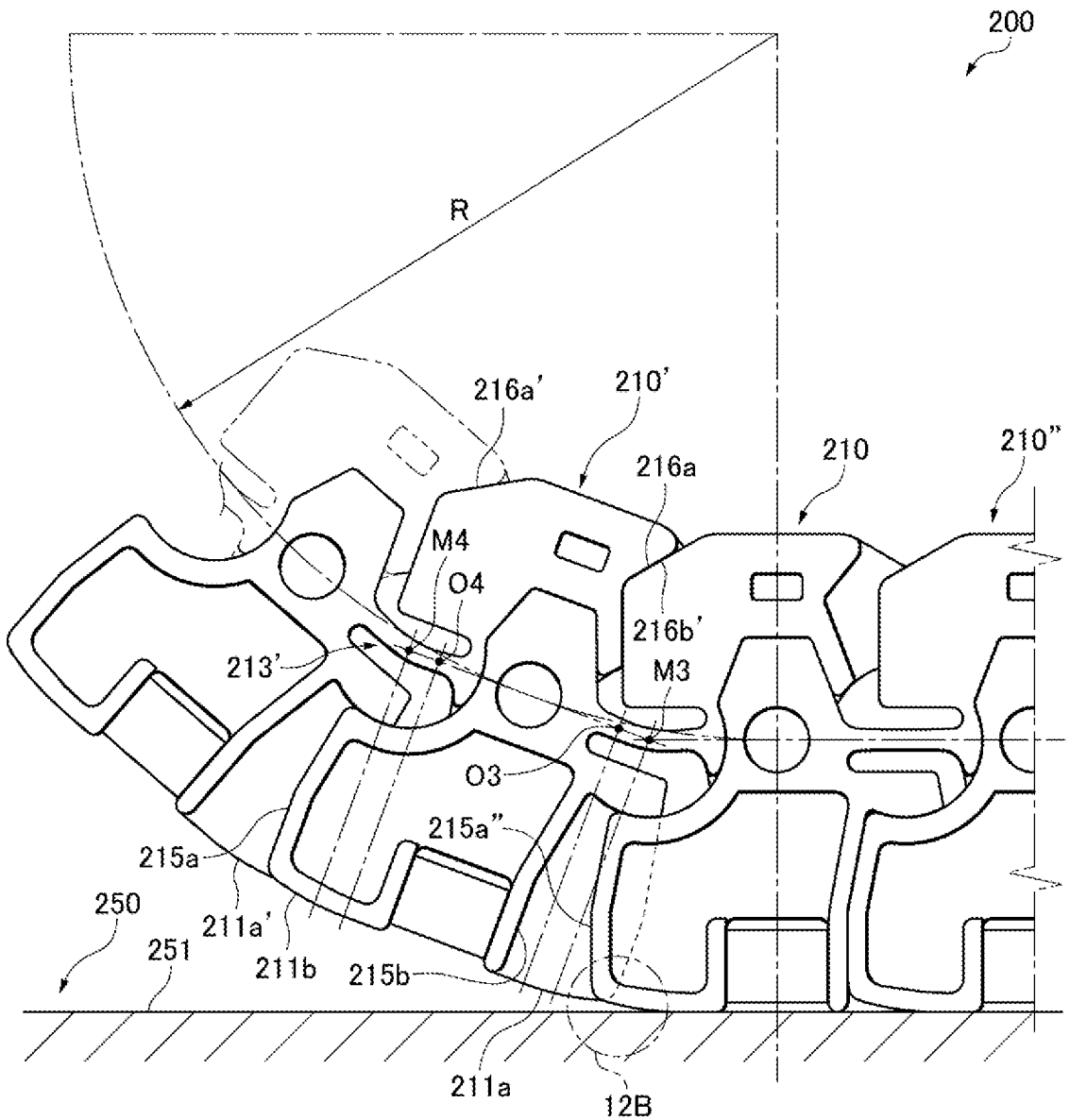
FIG. 12A is a view of the cable protection and guide device of the second embodiment of the present invention in a flexional position.
Figure 12B:
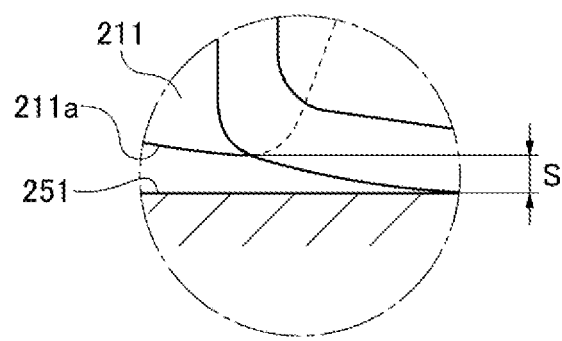
FIG. 12B is an enlarged view of a part 12B shown in FIG. 12A.
Figure 13A:
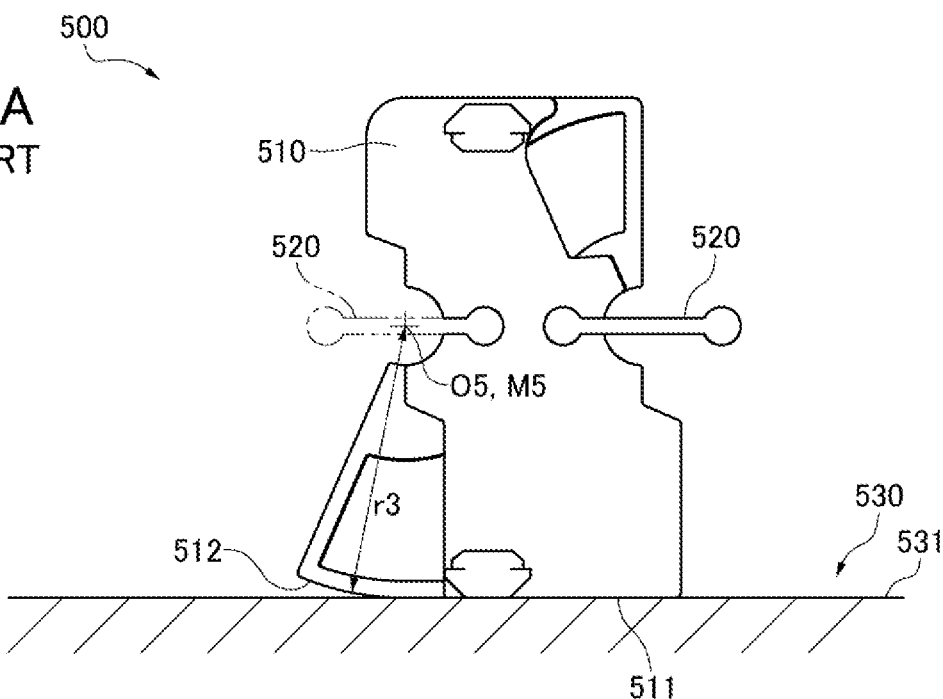
FIG. 13A is a view showing a link side plate of a cable protection and guide device of the prior art.
Figure 13B:
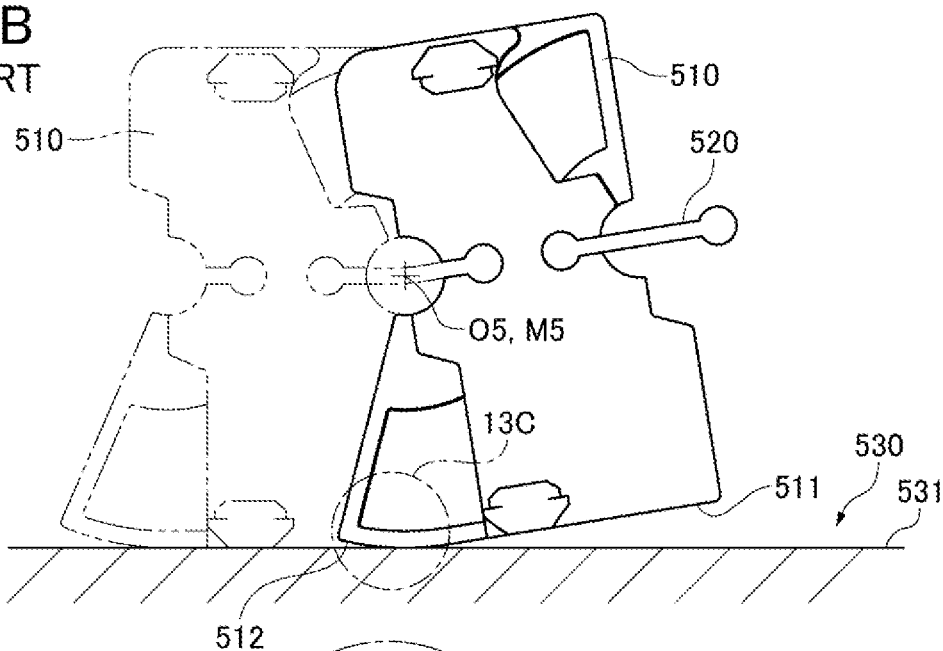
FIG. 13B illustrates the link side plate at the beginning of flexion.
Figure 13C:
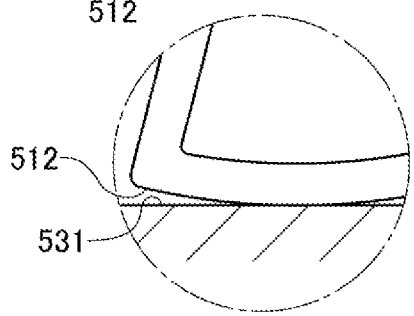
FIG. 13C is an enlarged view of a part in FIG. 13B.

FIG. 9 is a schematic front view of the cable protection and guide device 200 of the second embodiment of the present invention. FIG. 10 is a view of the cable protection and guide device 200 of the second embodiment of the present invention in a linear position. FIG. 11A is a view of the cable protection and guide device 200 of the second embodiment of the present invention at the beginning of flexion. FIG. 11B is an enlarged view of a part 11B shown in FIG. 11A. FIG. 12A is a view of the cable protection and guide device 200 of the second embodiment of the present invention in a flexional position. FIG. 12B is an enlarged view of a part 12B shown in FIG. 12A.

Because the cable protection and guide device 200 of the second embodiment of the present invention includes a first link side plate and a second link side plate that respectively have mirror-reversed shapes of the first link side plate 110 and the second link side plate 120 of the cable protection and guide device 100 of the first embodiment in the cable longitudinal direction, and has many elements that are in common with the cable protection and guide device 100, duplicate description will be avoided and reference numerals in the 200s having the same last two digit numbers as the corresponding elements of the cable protection and guide device 100 will be used for the common elements.

As shown in FIGS. 9 to 12B, the cable protection and guide device 200 has a number of link frame bodies connected to each other in a cable longitudinal direction. Each of the link frame bodies includes:
a pair of link side plates, namely, a first link side plate 210 and a second link side plate 220 provided so as to be spaced from each other in a lateral direction;
a first connecting arm 230 bridging over a cable flexional outer circumferential side of the first link side plate 210 and the second link side plate 220; and,
a second connecting arm (not shown) bridging over a cable flexional inner circumferential side of the first link side plate 210 and the second link side plate 220.

The device 200 accommodates and guides a cable C at the interior of the link frame bodies from a cable fixed end E2 to a cable movable end E1. The device 200 is capable of taking a linear position in which the device 200 is in contact with a support surface 251 of a support 250. The device 200 is capable of taking a flexional position in which the device 200 is spaced from the support surface 251.

Because the first link side plate 210 and the second link side plate 220 are bilaterally symmetrical with respect to an axis in the cable longitudinal direction, only the first link side plate 210 will be described with reference to FIGS. 9 to 12B to avoid duplicate description of the second link side plate 220.

In the second embodiment, the first link side plate 210 integrally includes a first link side plate 211 which is connected to a longitudinally preceding first link side plate 210' to form a cable flexional outer circumferential side, a rear side plate portion 212 which is connected to a succeeding first link side plate 210" to form a cable flexional inner circumferential side, and a flexible linkage portion 213 which is interposed between the front side plate portion 211 and the rear side plate portion 212.

The front side plate portion 211 of the first link side plate 210 includes a first flexional outer circumferential end surface 211a which is in an arc shape and provided on the cable flexional outer circumference side at a position corresponding to the linkage portion 213 of the first link side plate 210. An arc center O3 of the first flexional outer circumferential end surface 211a of the first link side plate 210 is provided so as to longitudinally precede a longitudinal center M3 of the linkage portion 213 of the first link side plate 210.

With this configuration, when the linkage portion 213 of the first link side plate 210 is bent from an original unbent state and the first flexional outer circumferential end surface 211a of the front side plate portion 211 of the first link side plate 210 rotationally moves about a substantial center of the linkage portion 213 of the first link side plate 210, a gap S is created between the first flexional outer circumferential end surface 211a of the front side plate portion 211 of the first link side plate 210 and the support surface 251 of the support 250.

The front side plate portion 211 of the first link side plate 210 includes a second flexional outer circumferential end surface 211b which is in an arc shape and provided on the cable flexional outer circumference side at a position corresponding to the linkage portion 213' of the preceding first link side plate 210'. An arc center O4 of the second flexional outer circumferential end surface 211b of the first link side plate 210 is provided so as to longitudinally succeed a longitudinal center M4 of the linkage portion 213' of the preceding first link side plate 210'.

With this configuration, when the device 200 is moved to the flexional position, the first flexional outer circumferential end surface 211a of the front side plate portion 211 of the first link side plate 210 and a second flexional outer circumferential end surface 211b" of the front side plate portion 211" of the succeeding first link side plate 210" intersect (engage) each other without creating a difference in level in the lateral direction.

The relationship between the first flexional outer circumferential end surface 211*a* of the front side plate portion 211 and the support surface 251 of the support 250 when the device 200 moves from the linear position to the flexional position will now be described in detail with reference to FIGS. 10 to 12B.

As shown in FIG. 10, when the device 200 is in the linear position, a flexional outer circumferential side surface of the front side plate portion 211 of the first link side plate 210 is in surface contact with the support surface 251 of the support 250.

At this point, the arc-shaped first flexional outer circumferential end surface 211*a* of the front side plate portion 211 of the first link side plate 210 is slightly in contact with the support surface 251 of the support 250 at a front portion thereof in the cable longitudinal direction.

As shown in FIG. 11A, as the cable movable end E1 moves from the state shown in FIG. 10, the device 200 gradually moves to the flexional position from a front side thereof in the cable longitudinal direction.

At this point, because the arc center O3 of the arc-shaped first flexional outer circumferential end surface 211*a* is provided so as to longitudinally precede the longitudinal center M3 of the linkage portion 213 of the first link side plate 210, the arc center O3 of the arc-shaped first flexional outer circumferential end surface 211*a* moves upward to the flexional inner circumferential side (or moves in a direction opposite to the support 250) to create the gap S between the first rear flexional outer circumferential end surface 211*a* of the first link side plate 210 and the support surface 251 of the support 250 as soon as the first link side plate 210 moves to the flexional position.

As shown in FIG. 12A, as the cable movable end E1 further moves from the state shown in FIG. 11A, the device 200 further moves to the flexional position at the front side thereof in the cable longitudinal direction.

At this point, the first link side plate 210 is further flexed and the arc center O3 of the arc-shaped first flexional outer circumferential end surface 211*a* of the first link side plate 210 further moves upward to the flexional inner circumferential side (or moves in a direction opposite to the support 250) to increase the gap S that was created between the first flexional outer circumferential end surface 211*a* of the first link side plate 210 and the support surface 251 of the support 250.

In other words, the first flexional outer circumferential end surface 211*a* of the front side plate portion 211 does not slide on the support surface 251 of the support 250.

When the device 200 moves back from the flexional position shown in FIG. 12A to the linear position shown in FIG. 10, the gap S exists between the first flexional outer circumferential end surface 211*a* of the front side plate portion 211 of the first link side plate 210 and the support surface 251 of the support 250 until the linkage portion 213 of the first link side plate 210 is unbent and the front side plate portion 211 of the first link side plate 210 rotationally moves about the substantial center of the linkage portion 213 of the first link side plate 210 to come in contact with the support surface 251 of the support 250.

The first link side plate 210 (second link side plate) integrally includes:

the front side plate portion 211 connected to the longitudinally preceding front link side plate 210' (second link side plate) to form the cable flexional outer circumferential side;

the rear side plate portion 212 connected to the longitudinally succeeding first link side plate 210" (second link side plate) to form the cable flexional inner circumferential side; and, the flexible linkage portion 213 interposed between the front side plate portion 211 and the rear side plate portion 212;

The front side plate portion 211 of the first link side plate 210 (second link side plate) includes the first flexional outer circumferential end surface 211*a* which is in an arc shape and provided on the cable flexional outer circumference side at a position corresponding to the linkage portion 213 of the first link side plate 210 (second link side plate). The arc center O3 of the first flexional outer circumferential end surface 211*a* of the first link side plate 210 (second link side plate) is provided so as to longitudinally precede the longitudinal center M3 of the linkage portion 213 of the first link side plate 210 (second link side plate). The first flexional outer circumferential end surface 211*a* of the front side plate portion 211 is prevented from sliding on the support surface 251 of the support 250 to prevent generation of abrasion powder, and to prevent noise.

The front side plate portion 211 of the first link side plate 210 (second link side plate) includes the second flexional outer circumferential end surface 211*b* which is in an arc shape and provided on the cable flexional outer circumference side at a position corresponding to the linkage portion 213' of the preceding first link side plate 210' (second link side plate). The arc center O4 of the second flexional outer circumferential end surface 211*b* of the first link side plate 210 (second link side plate) is provided so as to longitudinally succeed the longitudinal center M4 of the linkage portion 213' of the preceding first link side plate 210' (second link side plate). This structure makes the flexional outer circumferential edge smoother and prevents peripheral objects from getting stuck in the device 200 when moving back to the linear position.

The invention claimed is:

1. A cable protection and guide device having a number of link frame bodies connected to each other in a cable longitudinal direction between a cable fixed end and a cable movable end, comprising:

said cable fixed end affixed to a fixed support;

said cable movable end affixed to a movable support;

each of said link frame bodies includes an interior, said cable residing in said interior of said number of link frame bodies, said cable accommodated in said interior of said link frame bodies from said cable fixed end to said cable movable end;

each of said link frame bodies includes a pair of laterally spaced apart right and left link side plates;

each of said pair of said laterally spaced apart right and left link side plates are articulately connected to each other in a longitudinal direction enabling said side plates of said link frame bodies to form a flexional circumferential bend having a flexional inner circumferential side and a flexional outer circumferential side; each of said laterally spaced apart right and left link side plates includes a flexional inner circumferential side residing during bending on said flexional inner circumferential side of said bend; each of said laterally spaced apart right and left side plates includes a flexional outer circumferential side residing during bending on said flexional outer circumferential side of said bend;

each of said laterally spaced apart right and left link side plates integrally includes a front side plate portion connected to an adjacent link side plate in said cable longitudinal direction to form said flexional inner circumferential side, a rear side plate portion connected to another link side plate in said cable longitudinal direction to form said flexional outer circumferential side, and, a flexible linkage portion interposed between said front side plate portion and said rear side plate portion;

a first portion of said link frame bodies taking a linear position in which said first portion of said link frame bodies is in contact with a support surface of a support and a second portion of said link frame bodies taking a flexional position during bending in which said second portion of said link frame bodies is spaced from said support surface;

said rear side plate portion of each of said laterally spaced apart right and left link side plates includes a first flexional outer circumferential end surface which is in an arc shape on said flexional outer circumferential side;

during bending, a gap is formed between said first flexional outer circumferential end surface of said link side plate and said support surface of said support;

a flexional outer circumferential side connecting arm bridging over said flexional outer circumferential side of said right and left link side plates; and, a flexional inner circumferential side connecting arm bridging over said flexional inner circumferential side of said right and left link side plates.

2. The cable protection and guide device according to claim 1, wherein said rear side plate portion of each said link side plate comprises a second flexional outer circumferential end surface which is in an arc shape.

3. The cable protection and guide device according to claim 2, wherein a curvature radius of said first flexional outer circumferential end surface and a curvature radius of said second flexional outer circumferential end surface are equal to the length from said support surface of said support to said linkage portion of said link side plate which is in contact with said support surface.

4. A cable protection and guide device having a number of link frame bodies connected to each other in a cable longitudinal direction between a cable fixed end and a cable movable end, comprising:

said cable fixed end affixed to a fixed support;

said cable movable end affixed to a movable support;

each of said link frame bodies includes an interior, said cable residing in said interior of said number of link frame bodies, said cable accommodated in said interior of said link frame bodies from said cable fixed end to said cable movable end;

each of said link frame bodies includes a pair of laterally spaced apart right and left link side plates;

each of said pair of said laterally spaced apart right and left link side plates are articulately connected to each other in a longitudinal direction enabling said side plates of said link frame bodies to form a flexional circumferential bend having a flexional inner circumferential side and a flexional outer circumferential side; each of said laterally spaced apart right and left link side plates includes a flexional inner circumferential side residing during bending on said flexional inner circumferential side of said bend; each of said laterally spaced apart right and left side plates includes a flexional outer circumferential side residing during bending on said flexional outer circumferential side of said bend;

each of said laterally spaced apart right and left link side plates integrally includes a front side plate portion connected to an adjacent link side plate in said cable longitudinal direction to form said flexional outer circumferential side, a rear side plate portion connected to another link side plate in said cable longitudinal direction to form said flexional inner circumferential side, and, a flexible linkage portion interposed between said front side plate portion and said rear side plate portion;

a first portion of said link frame bodies taking a linear position in which said first portion of said link frame bodies is in contact with a support surface of a support and a second portion of said link frame bodies taking a flexional position during bending in which said second portion of said link frame bodies is spaced from said support surface;

said front side plate portion of said link side plate comprising a first flexional outer circumferential end surface which is in an arc shape and provided on said cable flexional outer circumference side;

during bending, a gap is formed between said first flexional outer circumferential end surface of said link side plate and said support surface of said support;

a flexional outer circumferential side connecting arm bridging over said flexional outer circumferential side of said right and left link side plates; and, a flexional inner circumferential side connecting arm bridging over said flexional inner circumferential side of said right and left link side plates.

5. The cable protection and guide device according to claim 4, wherein said front side plate portion of said link side plate comprises a second flexional outer circumferential end surface which is in an arc shape.

6. The cable protection and guide device according to claim 5, wherein a curvature radius of said first flexional outer circumferential end surface and a curvature radius of said second flexional outer circumferential end surface are equal to the length from said support surface of said support to said linkage portion of said link side plate which is in contact with said support surface.

* * * * *